(12) United States Patent
Baumeister et al.

(10) Patent No.: US 11,585,537 B2
(45) Date of Patent: Feb. 21, 2023

(54) PIVOTABLE ILLUMINATION DEVICE

(71) Applicant: BJB GmbH & Co. KG, Arnsberg (DE)

(72) Inventors: Olaf Baumeister, Sundern (DE); Joerg Harnischmacher, Menden (DE)

(73) Assignee: BJB GmbH & Co. KG, Arnsberg (DE)

( * ) Notice: Subject to any disclaimer, the term of this patent is extended or adjusted under 35 U.S.C. 154(b) by 254 days.

(21) Appl. No.: 17/013,995

(22) Filed: Sep. 8, 2020

(65) Prior Publication Data

US 2021/0131671 A1 May 6, 2021

(30) Foreign Application Priority Data

Nov. 6, 2019 (DE) .................... DE202019106170.7

(51) Int. Cl.
| | |
|---|---|
| *F24C 15/00* | (2006.01) |
| *F21V 29/80* | (2015.01) |
| *F21V 21/30* | (2006.01) |
| *F21V 8/00* | (2006.01) |
| *F21V 5/04* | (2006.01) |
| *F21Y 115/10* | (2016.01) |
| *A47J 27/04* | (2006.01) |
| *F21V 19/00* | (2006.01) |
| *H05B 6/64* | (2006.01) |

(52) U.S. Cl.
CPC ............ *F24C 15/008* (2013.01); *F21V 5/043* (2013.01); *F21V 21/30* (2013.01); *F21V 29/80* (2015.01); *G02B 6/0005* (2013.01); *A47J 27/04* (2013.01); *F21V 19/0055* (2013.01); *F21Y 2115/10* (2016.08); *H05B 6/6444* (2013.01)

(58) Field of Classification Search
CPC .................. F24C 15/008; G02B 6/005; F21W 2131/307; H05B 6/6444
See application file for complete search history.

(56) References Cited

U.S. PATENT DOCUMENTS

| | | | |
|---|---|---|---|
| 1,719,972 A | 7/1929 | Faulds | |
| 10,151,495 B2 * | 12/2018 | Baumeister | ............. F24C 7/082 |
| 2005/0155597 A1 * | 7/2005 | Wolter | .................. F21V 33/008 |
| | | | 126/25 R |
| 2009/0097263 A1 * | 4/2009 | Ko | ............................ F21L 4/04 |
| | | | 362/372 |
| 2011/0149551 A1 | 6/2011 | Camarillo | |

FOREIGN PATENT DOCUMENTS

| | | | |
|---|---|---|---|
| CN | 2802274 | * | 8/2006 |
| CN | 207065301 U | | 3/2018 |
| CN | 108980700 A | | 12/2018 |
| CN | 110088527 A | | 8/2019 |
| DE | 10318860 A1 | | 11/2004 |
| EP | 3193085 A1 | | 12/2016 |

* cited by examiner

*Primary Examiner* — Julie A Bannan
(74) *Attorney, Agent, or Firm* — Von Rohrscheidt Patents

(57) ABSTRACT

An illumination device for a cooking apparatus, the illumination device including a light source and a light conductor rod that conducts light emitted by the light source to a cooking cavity of the cooking apparatus; a support that supports the light conductor rod at a support element of the cooking apparatus, wherein the support includes a pivot joint that supports a fixing device for the light conductor rod, so that the light conductor rod is movably supported in the support.

6 Claims, 4 Drawing Sheets

PIVOTABLE ILLUMINATION DEVICE

RELATED APPLICATIONS

This application claims priority from and incorporates by reference German utility model DE 20 2019 106 170.7, filed on Nov. 6, 2019.

FIELD OF THE INVENTION

The invention relates to a illumination device for cooking apparatuses, in particular for ovens, steam cookers or microwave cooking apparatuses.

BACKGROUND OF THE INVENTION

It is known in the art to use LED illuminants for illuminating cooking cavities of cooking apparatuses. Since LED lights are temperature sensitive they are protected by various measures against heat development or heat radiation of the cooking cavity. It has proven advantageous to conduct the light that is emitted by the light source to the cooking cavity by a light conductor. Typically light conductors are used that include rigid light conducting rods made from glass or high temperature resistant material. The LED light source is arranged in the cooking apparatus as far away from the cooking cavity as possible, The light conductor penetrates the cooking cavity wall at a suitable location and is configured in a section that is arranged within the cooking cavity so that the light conductor illuminates the cooking cavity in a large surface area or punctiform.

The LED light source and the light conductor rod are joined into an illumination device using additional components, in particular a cooling body configured to dissipate heat that is generated during operations of the LED and a support that couples the components with each other, Typically the support arranges the illumination device at a component of the cooking apparatus.

Since there are many ways to illuminate the cooking cavity of a cooking apparatus a plethora of illumination devices is available in different configurations. Thus, there are illumination devices that have light conductor rods that are arranged in corners of the cooking cavity wall over an entire height of the cooking cavity. Illumination devices are known where the light conductor rods are inserted into a cooking cavity wall recess and therefore protected against contact. Such recesses can extend e.g. in a cooking cavity side wail from a forward upper corner into a rear lower corner, thus diagonally along the cooking cavity wall. Other illumination devices penetrate the cooking cavity wall only with the free end of the light conductor in order to keep the penetration opening as small as possible. For this purpose free ends of the light conductor are processed accordingly in order to achieve the intended light scattering.

Also the cooking apparatus components where the illumination devices are attached are shaped differently, in particular there is no standardized orientation of the support element relative to an orientation of the light conductor rod.

Eventually the light conductor rods have to penetrate plural shielding plates between the support element and the cooking cavity wall wherein the shielding plates are configured to shield thermal radiation from the cooking cavity.

BRIEF SUMMARY OF THE INVENTION

Thus, it is an object of the invention to reduce a number of different illumination devices and to provide a universally usable illumination device for cooking apparatuses in a simple manner.

The object is achieved by an illumination device for a cooking apparatus, the illumination device including a light source and a light conductor rod that conducts light emitted by the light source to a cooking cavity of the cooking apparatus; a support that supports the light conductor rod at a support element of the cooking apparatus, wherein the support includes a pivot joint that supports a fixing device for the light conductor rod, so that the light conductor rod is movably supported in the support.

Thus, it is provided that the pivot joint includes a first pivot axis wherein the light conductor rod is pivot able about the first pivot axis.

Additionally the invention is characterized in that the pivot joint has a second pivot axis and the light conductor rod is pivotable about the second pivot axis.

In particular it is provided that the pivot joint is a universal joint. Alternatively the pivot joint can be a ball joint.

The pivotable arrangement of the light conductor rod in the support of the illumination device facilitates adjusting the light conductor rod with respect to its orientation relative to the support element of the cooking apparatus. Depending on the degrees of freedom of the joint the same illumination device can be used for a plurality of cooking apparatuses that have a different orientation of the support element relative to a nominal position of the light conductor rod.

Advantageously all major components of the illumination device, thus cooling element LED circuit board with LED light source and the light conductor rod are joined to form a sub assembly that is movably supported in the support device, The pivot joint can be universal joint or a ball joint.

BRIEF DESCRIPTION OF THE DRAWINGS

The invention is now described based on advantageous embodiments with reference to drawing figures, wherein.

DETAILED DESCRIPTION OF THE INVENTION

Figure 1:
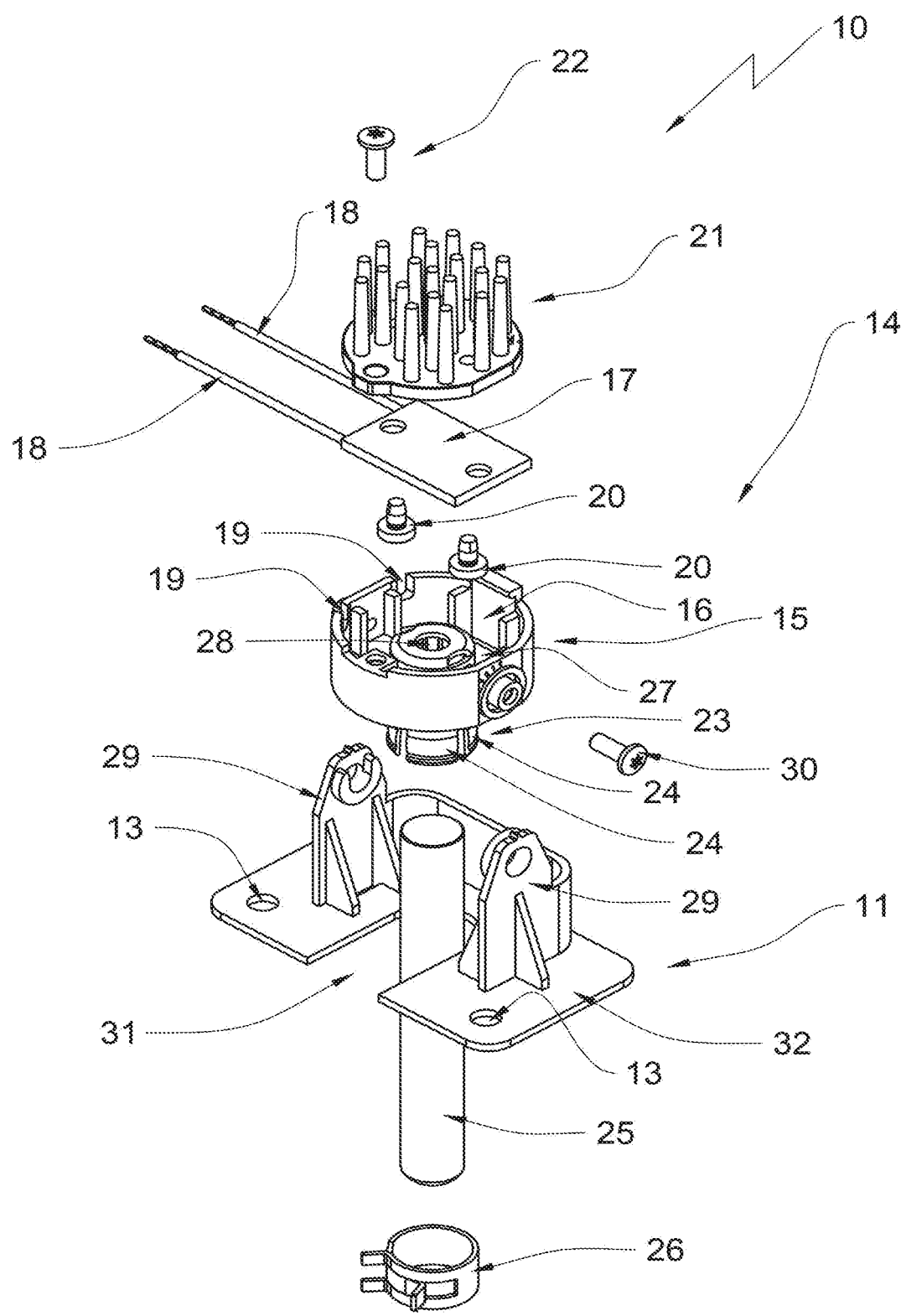
FIG. 1 illustrates an illumination device according to the invention in an exploded view.

An illumination device according to the invention is designated in the drawing figures overall with reference numeral 10.

The illumination device is illustrated in FIG. 1 in an exploded view. The illumination device includes a support 11 that supports the illumination device 10 at a support element 12 of a cooking apparatus. Thus the support 11 can include e.g. attachment bore holes 13 that are configured for bolting or riveting the illumination device at the support element 12.

The support 11 is furthermore configured to support the actual cooking apparatus light that is designated overall with the reference numeral 14.

The cooking apparatus light includes a coupling pot 15 with a receiver 16 into which a circuit board 17 is inserted that has an LED arranged thereon. The circuit board 17 includes connecting conductors 18 wherein connecting conductors sections 19 are configured to be run out of the coupling pot 15.

In the instant embodiment the circuit board 17 is attached on a cooling body 21 by attachment bolts 20. The cooling body 21 is attached at the coupling pot 15 by a retaining screw 22.

The coupling pot 15 is provided with a support collar 23 at a side that is oriented away from the cooling element 21, wherein the support collar is formed by individual spring elastic support tongues that are motion decoupled from each other. The annular cavity of the support collar 23 receives a light conductor rod 25 that is supported by the support tongues 24 and a spring elastic ring 26 that clamps the support tongues 24 against the light conductor rod 25.

The support collar 23 transitions into a dead hole recess 27 that forms a light opening 28 at its base. Thus the light opening 28 is arranged above the LED and facilitates a transition of light emitted by the LED into the light conductor rod 25.

The coupling pot 15 is pivotably supported in two opposite reaction bearings 29 of the support 11 and supported therein by support screws 30. The support screws 30 form the pivot axis of the coupling pot 15.

The support 11 includes a slotted hole 31 or a cut out 31 wherein the light conductor rod passes through the cut out through the mounting plate 32 of the support 11.

Figure 2:
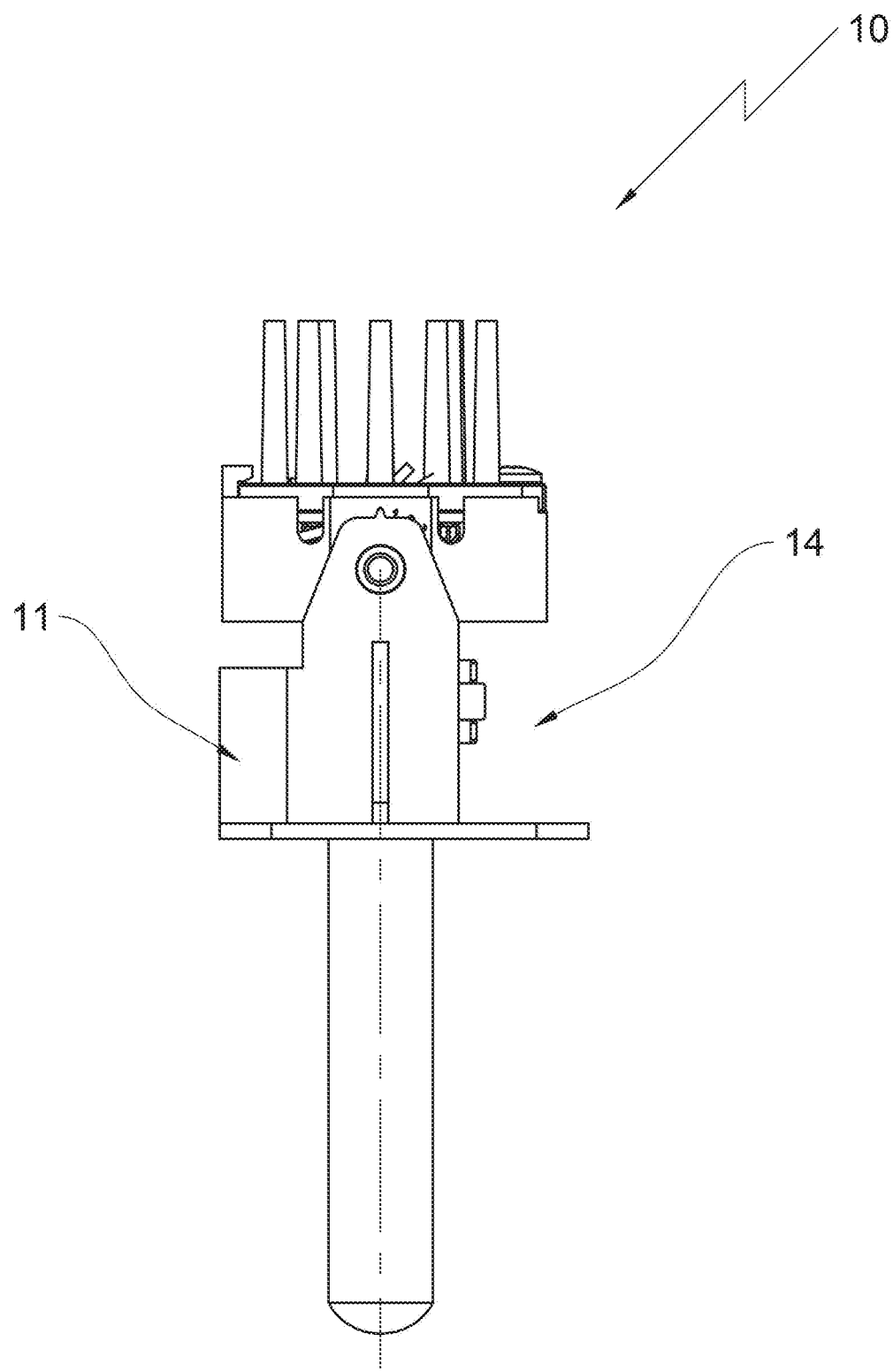
FIG. 2 illustrates the illumination device of FIG. 1 in a side view.
Figure 3:
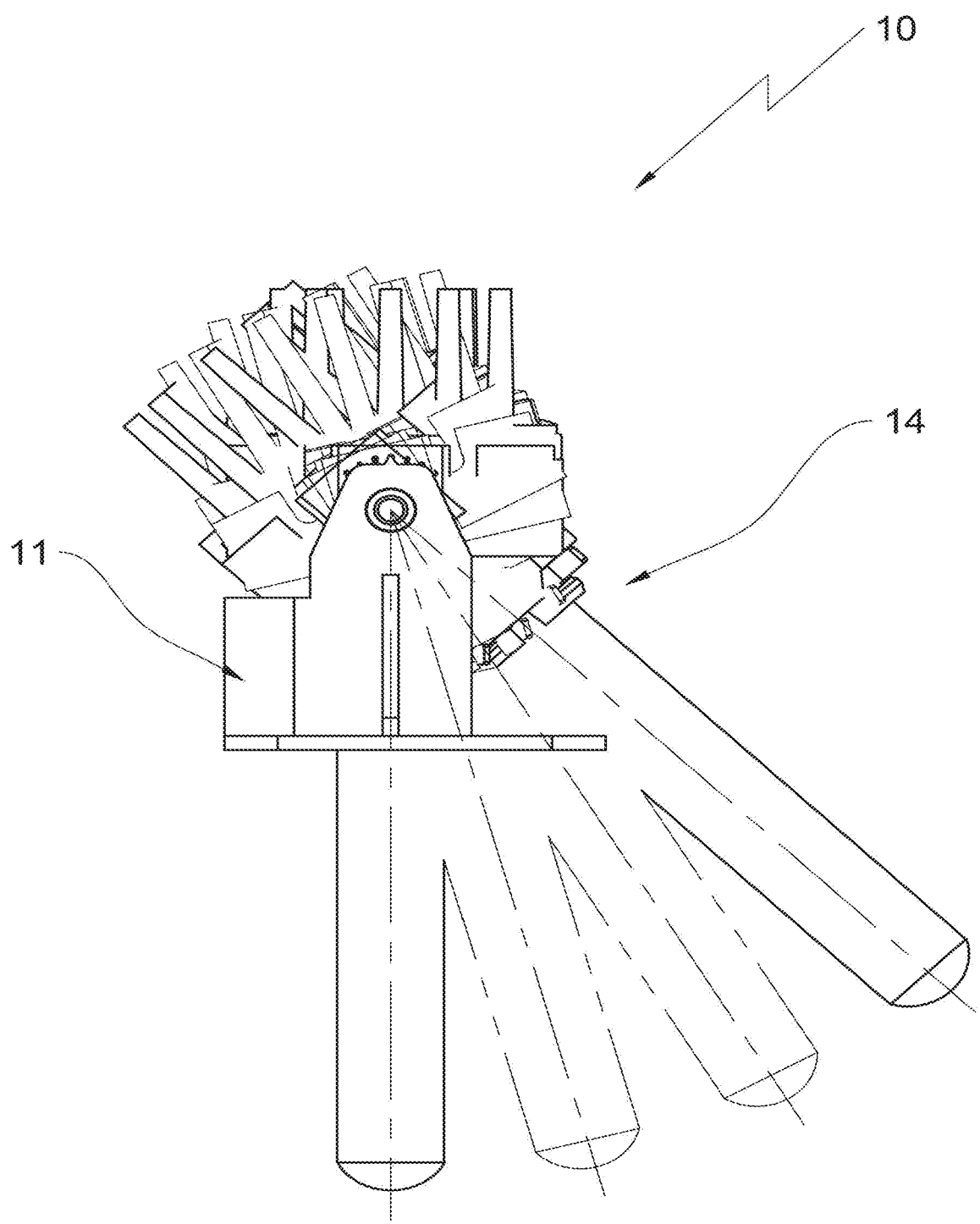
FIG. 3 illustrates the illumination device according to FIG. 2 in different pivot positions of the light conductor rod.

FIG. 2 illustrates the illumination device 10 according to the invention with the support 11 and the cooking apparatus light 14 in assembled condition. From FIG. 3 it is evident that the cooking apparatus light 14 is a sub assembly that includes the plurality of individual elements described supra and that is pivotably supported in the support 11 about a pivot axis. Thus, various pivot positions of the cooking apparatus light 14 are illustrated in an exemplary manner. The cooking apparatus light 14 is in a first end position in a vertical orientation. The cooking apparatus light is in a second end position at an angle of 45° relative to the vertical position. The cooking apparatus light is continuously pivotable between both end positions. Incremental pivotability can also be implemented, Thus it is possible to configure an engaging interlocking contour between the coupling pot 15 and the respective reaction bearing 29.

Figure 4:
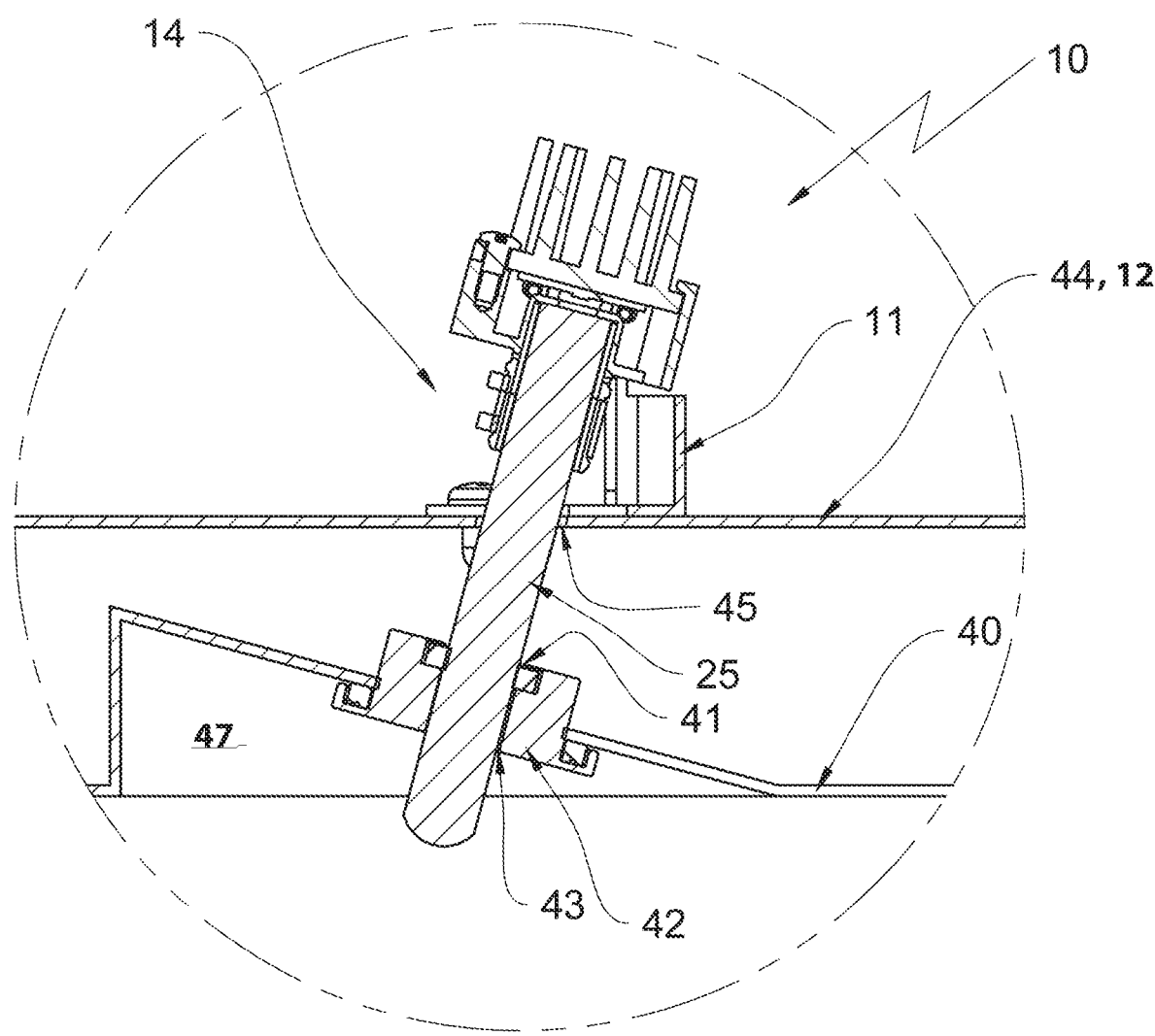
FIG. 4 illustrates an exemplary view of a typical installed configuration of the illumination device according to FIGS. 1-3 in a cooking apparatus.

FIG. 4 illustrates the illumination device 10 according to the invention in installed condition in a cooking apparatus. A partially illustrated cooking apparatus wall 40 includes a wall opening 41 with a seal element 42 arranged therein. This seal element 42 includes an annular recess 43. The light conductor rod 25 of the cooking apparatus light 14 is arranged in the annular recess 43 in order to conduct light into the cooking cavity 47.

The support 14 is attached at a shielding plate 44 which functions as a support element of the cooking apparatus. Also the shielding plate 44 includes a wall opening that is provided with the reference numeral 45 that facilitates the penetration of the light conducting rod 25 through the shielding plate 44 into the cooking cavity 47.

As illustrated in FIG. 4 the cooking cavity wall includes a cavity or a recess 46 in which a light emitting end of the light conductor rod is inserted. The cooking cavity wall 40 thus extends at an angle greater than 0°, thus it is not parallel to the shielding plate 44. Therefore an angled orientation relative to the cooking cavity wall 40 is required in order to run the light conducting rod 25 through the cooking cavity wall 40 and the shielding plate 44. Thus, the light conducting rod 25 is arranged at an angle of 90° relative to the cooking cavity wall in order to penetrate the seal element 42 in a perpendicular manner and facilitate a simple configuration of the seal element 42, Differently from FIG. 4 and due to the pivotable support of the cooking cavity light 14 in the support device 11, the illumination device 10 is also usable in a cooking apparatus where the cooking cavity wall 40 extends parallel to the shielding plate 44. In this case the light conducting rod 25 has a strictly orthogonal orientation.

The pivotable support of the cooking apparatus light 14 in the support 11 and thus the illumination device 10 according to the invention has an additional advantage. When the illumination device 10 is not fixed directly at the cooking cavity wall 40 but at a component that is offset from the cooking cavity wall 40 and essentially motion decoupled therefrom different thermal expansion properties of the cooking cavity wall 40 and the cooking cavity support element cause a displacement of the cooking cavity wall 40 relative to the cooking apparatus support element.

In FIG. 4 this means that temperature effects will move the seal element 42 that sits in the cooking cavity wall 40 due to expansion properties of the cooking cavity wall 40 so that the seal element 42 moves relative to the support 11 or relative to the shielding plate 44 horizontally as well as vertically relative to the drawing plane. The pivotable support of the cooking apparatus light 14 facilitates compensating these relative movements caused by temperature changes in the cooking cavity without requiring a complex configuration of the seal element 42.

REFERENCE NUMERALS AND DESIGNATIONS 10 illumination device
11 support
12 support element of cooking apparatus
13 attachment bore hole
14 cooking apparatus light
15 coupling pot
16 receiver
17 circuit board
18 connection conductor
19 connection conductor cut out
20 support screw
21 cooling element
22 support screw
23 support collar
24 support tongue
25 light conductor rod
26 spring elastic ring
27 recess
28 light opening
29 reaction bearing
30 bearing screw
31 slotted hole/cut out
32 mounting plate
40 cooking cavity wall
41 cooking cavity wall opening
42 seal element
43 annular recess
44 shielding plate
45 wall opening
46 recess
47 cooking cavity

What is claimed is:

1. A cooking apparatus, comprising:
a cooking cavity wall including a cooking cavity wall opening;
an illumination device including a cooking apparatus light including a light permeable light conductor rod that conducts light emitted by the cooking apparatus light to a cooking cavity of the cooking apparatus through the cooking cavity wall opening;

a support that supports the light permeable light conductor rod at a shielding plate fixed at an exterior of the cooking cavity wall, wherein the support includes a pivot joint that supports a fixing device for the light permeable light conductor rod, so that the light permeable light conductor rod is pivotably supported in the support so that thermally induced movements of the cooking cavity wall relative to the support are compensatable.

2. The cooking apparatus according to claim 1, wherein the pivot joint has a first pivot axis, and wherein the illumination device including the cooking apparatus light and the light permeable light conductor rod is pivotable about the first pivot axis.

3. The cooking apparatus according to claim 2, wherein the pivot joint includes a second pivot axis, and wherein the illumination device including the cooking apparatus light and the light permeable light conductor rod is pivot able about the second pivot axis.

4. The cooking apparatus according to claim 3, wherein the pivot joint is a universal joint.

5. The cooking apparatus according to claim 3, wherein the pivot joint is a ball joint.

6. The cooking apparatus according to claim 1, wherein the shielding plate supports a seal element with an annular recess that envelops the light permeable light conductor rod.

* * * * *